(12) United States Patent
Johannesson et al.

(10) Patent No.: US 10,029,770 B2
(45) Date of Patent: Jul. 24, 2018

(54) USE OF AN AIR LUBRICATION SYSTEM FOR REDUCING MARINE GROWTH ON A VESSEL

(71) Applicant: SILVERSTREAM TECHNOLOGIES B.V., Amstelveen (NL)

(72) Inventors: Johannes Johannesson, Espergaerde (DK); Noah Silberschmidt, London (GB); Jorgen Clausen, Broendby (DK)

(73) Assignee: SILVERSTREAM TECHNOLOGIES B.V., Amstelveen (NL)

( * ) Notice: Subject to any disclaimer, the term of this patent is extended or adjusted under 35 U.S.C. 154(b) by 0 days.

(21) Appl. No.: 15/123,691

(22) PCT Filed: Mar. 4, 2015

(86) PCT No.: PCT/NL2015/050137
§ 371 (c)(1),
(2) Date: Sep. 6, 2016

(87) PCT Pub. No.: WO2015/133901
PCT Pub. Date: Sep. 11, 2015

(65) Prior Publication Data
US 2017/0015394 A1 Jan. 19, 2017

(30) Foreign Application Priority Data

Mar. 5, 2014 (EP) .................................. 14157871
Mar. 21, 2014 (EP) .................................. 14161065

(51) Int. Cl.
*B63B 1/38* (2006.01)
*B63B 1/32* (2006.01)
*B63B 59/04* (2006.01)

(52) U.S. Cl.
CPC .............. *B63B 59/04* (2013.01); *B63B 1/38* (2013.01); *B63B 2001/387* (2013.01); *Y02T 70/122* (2013.01)

(58) Field of Classification Search
CPC ............. B63B 1/38; B63B 2001/385; B63B 2001/387; B63B 59/00; B63B 59/04; B63B 2059/00
USPC ....................................... 114/67 A, 288, 289
See application file for complete search history.

(56) References Cited

U.S. PATENT DOCUMENTS 3,661,506 A * 5/1972 Watkins .................. B63B 59/04
114/67 R
3,680,517 A * 8/1972 Morrison .................. B63B 1/38
114/67 A (Continued)

FOREIGN PATENT DOCUMENTS

| JP | 2002-002582 A | 1/2002 |
| WO | 2010/058611 A1 | 5/2010 |
| WO | 2013/125951 A1 | 8/2013 |

OTHER PUBLICATIONS

International Search Report, dated Jul. 7, 2015, from corresponding PCT application.

Primary Examiner — Daniel V Venne
(74) Attorney, Agent, or Firm — Young & Thompson (57) ABSTRACT

A method for reducing marine growth on a vessel, includes providing an air lubrication system and covering at least a part of the hull with air bubbles. Also described is a vessel having an air lubricating system with releasable connection of the deflectors across the cavity, a closeable outlet valve in the air outlet duct, connection of a compressor to each cavity or pair of cavities and an air inlet opening in the top of the cavity.

12 Claims, 6 Drawing Sheets

(56) References Cited

U.S. PATENT DOCUMENTS

| | | | |
|---|---|---|---|
| 3,690,283 A | 9/1972 | Pool | |
| 3,871,318 A * | 3/1975 | Clerk | B63B 1/04 114/67 A |
| 4,165,703 A * | 8/1979 | Burg | B63B 1/38 114/289 |
| 4,896,621 A * | 1/1990 | Coles | B63B 1/248 114/274 |
| 5,524,568 A * | 6/1996 | Bobst | B63B 1/38 114/222 |
| 5,967,071 A * | 10/1999 | Wipper | B63B 1/38 114/67 A |
| 6,145,459 A | 11/2000 | Takahashi et al. | |
| 6,575,106 B1 * | 6/2003 | Whitener | B63B 1/20 114/291 |
| 6,634,309 B2 * | 10/2003 | Radrizzani | B63B 1/20 114/291 |
| 6,932,012 B1 * | 8/2005 | Philips | B63B 1/125 114/61.1 |
| 7,044,073 B2 * | 5/2006 | Goldstein | B63B 1/34 114/67 A |
| 7,814,853 B2 * | 10/2010 | Adams | B63B 1/20 114/289 |
| 7,992,507 B2 * | 8/2011 | Adams | B63B 1/38 114/289 |
| 7,997,221 B2 * | 8/2011 | Costas | B63B 1/38 114/67 A |
| 8,011,311 B2 * | 9/2011 | Al-Rujaib | B63B 59/04 114/222 |
| 8,196,536 B1 * | 6/2012 | Harbin | B63B 1/34 114/67 A |
| 8,327,784 B2 * | 12/2012 | Costas | B63B 1/38 114/67 A |
| 8,381,668 B2 | 2/2013 | Takano et al. | |
| 8,677,918 B2 * | 3/2014 | Harbin | B63B 1/38 114/67 A |
| 8,763,547 B2 * | 7/2014 | Costas | F04F 5/04 114/67 A |
| 2003/0001291 A1 * | 1/2003 | Stevens | B01F 3/04262 261/77 |
| 2010/0101471 A1 * | 4/2010 | van Krieken | B63B 1/04 114/39.25 |
| 2011/0048309 A1 * | 3/2011 | Al-Rujaib | B63B 59/04 114/222 |
| 2012/0247383 A1 | 10/2012 | Wu et al. | |
| 2014/0331912 A1 | 11/2014 | Wu et al. | |

\* cited by examiner

USE OF AN AIR LUBRICATION SYSTEM FOR REDUCING MARINE GROWTH ON A VESSEL

FIELD OF THE INVENTION

The invention relates to a method for reducing marine growth on a vessel.

The invention furthermore relates to a system for providing an air lubricating layer between a hull of a vessel and water along the hull as the vessel is moving through the water, which system comprises sidewalls and a top wall defining a cavity with an opening situated in an interface plane that is transversely to the sidewalls, substantially at the level of the hull, the opening having a front end and a rear end when seen in the length direction of the cavity, an air inlet spaced from the opening of the cavity, at least one water deflector being provided in the cavity.

The invention also relates to a vessel comprising a system for providing an air lubricating layer, a compressor being connected to the cavity for supplying air into the cavity via an air outlet duct.

BACKGROUND OF THE INVENTION

Such a system and vessel are known from WO 2013/125951, filed in the name of the applicant. In this publication it is described that efficient air lubrication of a flat bottom of a vessel is achieved by providing a relatively small-sized open cavity and injecting air into the cavity at about hydrostatic pressure, such that a substantially flat water-air interface is formed at the height of the bottom. At this interface, air is mixed into the water due to the Kelvin Helmholtz mixing effect, and a stream of air bubbles escapes from the rear of the cavity. Such cavities were found to provide a stable and efficient manner of providing a layer of bubbles along the bottom, reducing frictional drag such that the energy gain as a result of reduced friction during propulsion by far outweighs the extra energy required for injecting air at hydrostatic pressures into the cavity.

In order to facilitate emptying of the cavity during start up, a number of curved wave deflectors is described that extend transversely across the cavity. The wave deflectors reduce turbulence inside the cavity and cause air to be retained inside the cavity for a longer period of time such that compressors of reduced capacity for less powerful air injection during start up are required.

In U.S. Pat. No. 6,145,459 an air lubrication system is described in which air is injected along the hull at an angle towards the stern via a slit connected to a cavity containing compressed air on the inside surface of the hull. A wire is placed upstream of the exit point of the slit in the hull to cause turbulence that breaks up the air volume hence forming small bubbles. The known system has as a disadvantage that air injection requires relatively high pressures and is relatively inefficient in view of the power required for lubrication versus reduction in frictional drag. Furthermore, the wire on the outside of the hull is relatively vulnerable, produces additional drag and may form a point of attachment for dirt, shellfish or seaweed.

JP 2002-2582 A describes an air cavity vessel having a cavity and having a special upstream wedge projecting below bottom level for creating an under pressure inside the cavity. Air is supplied to the cavity without the need for a compressor in view of the created under pressure. Inside the cavity, a lower front part results in an uneven and turbulent air-water interface causing mixing of water and air. Small-size bubbles having a relatively low internal pressure exit at the rear of the cavity, the bubble size decreasing due the water pressure when the bubbles travel along the bottom of the hull. The known lubrication system is relatively inefficient as it operates at non-controlled under-pressures created inside the cavity, and fails to form a flat air-water interface that is level with the flat bottom, allowing mixing of air and water by the Kelvin Helmholtz effect along said whole interface and unrestricted exit from the cavity along the interface onto the bottom in a well-defined and undisturbed boundary layer.

In case the vessel sails in shallow waters, the air cavities and/or air ducts supplying air to the cavities may become filled and blocked by silt or soil or other materials originating from the sea bed.

For maintenance purposes the cavities should be easily inspected when the vessel is in dry dock. Also, access to the cavity interior for maintenance purposes should be facilitated.

It is found that marine growth on the vessel hull, such as barnacles or other crustaceous growth on the vessel bottom, or weed or algae on the vessel sides, highly increases the water resistance.

It is therefore an object of the present invention to provide a method of reducing water resistance. It is in particular an object of the invention provide a method for reducing marine growth on the hull.

It is a further object of the invention to provide a system for air lubrication that has an air supply duct which can be easily cleaned from silt or soil, or other blocking substances entering into the air outlet duct.

Other objects are to provide an air cavity system that has improved efficiency during start up and that shows reduced instabilities inside the cavity. It is a further object to provide a system and vessel providing reduced water disturbance in case no air is included in the cavity and a stable air-water interface inside the cavity during roll motions.

The invention aims to provide an improved distribution of the cavities along the bottom for increased air lubrication.

Furthermore, the invention strives to provide improved control and safety of the air lubrication system.

It is another object of the invention to provide an air lubrication system having improved airflow characteristics.

SUMMARY OF THE INVENTION

Hereto a system according to the invention is characterised in that it comprises the step of providing an air lubrication system and covering at least a part of the hull with air bubbles.

The inventors have discovered that providing a layer of air bubbles across the hull reduces marine growth on the vessel, further reducing water resistance. The invention hence relates to a method for reducing marine growth on a vessel, comprising providing an air lubrication system covering at least a part of the hull with air bubbles.

Preferably the method of reducing marine growth comprises use of an air cavity system having sidewalls and a top wall defining a cavity with an opening situated in an interface plane that is transversely to the sidewalls, substantially at the level of the hull, for instance a substantially flat bottom, the opening having a front end and a rear end when seen in the length direction of the cavity, a compressor being connected to the cavity, a compressor being connected to the cavity for supplying air into the cavity via an air outlet duct.

An embodiment of a method of reducing marine growth involves providing an air system on the sidewalls of the vessel. Such a system may be an air system as known from U.S. Pat. No. 6,145,459.

By use of an air cavity system such as described in WO 2013/125951 on the bottom and the system of U.S. Pat. No. 6,145,459, or another comparable system known in the art, on the sides of the hull, an effective combined effect of reducing frictional drag when sailing by air lubrication and by reduction of marine growth can be obtained.

Surprisingly, the applicants have found that an air lubrication system can be effectively used on a vessel for the reduction of marine growth on the hull of the vessel. The air pressure of the air bubble generator may be continuous or may be varied or pulsed for an optimal and energy-effective anti-fouling effect. The air lubrication system may be activated continuously or intermittently, or be activated at reduced energy levels when the vessel is stationary.

For instance, it is possible to combine formation of the air bubbles with introduction of high frequency energy into the bubbles, such as generated by an ultrasound transducer. Such bubbles have been found to result in effective mechanical cleaning of the hull surface along which the bubbles travel in the boundary layer. Such additional energy may be charged into the bubbles continuously or at specific time intervals for energy efficient cleaning. Furthermore, the bubbles may be provided with an electric charge for more efficiently clinging to the hull and providing improved lubrication combined with an improved anti-fouling effect.

In a preferred embodiment, the deflectors extending substantially across the width of the cavity are releasably connected across the cavity.

By having attaching the deflectors in a removable manner to the cavity, the interior of the cavity is accessible from the outside, for instance by placing the vessel in a dry dock on struts for inspection or maintenance, such as removal of rust, marine growth and/or painting.

In an embodiment, a number of deflectors, preferably each deflector, is connected to the vessel via at least two outwardly accessible releasable bolts.

Another vessel according to the invention is characterised in that the vessel comprises a flushing fluid duct and a flushing fluid source connected to said duct which flushing duct in operation is connected to the air outlet duct.

By attaching the air outlet duct to the flushing duct, soil and other blocking substances can be effectively removed from the air outlet duct.

In an embodiment, the flushing duct comprises a fire extinguishing duct or hose, the flushing fluid source comprising a fire extinguishing system.

By using the fire extinguishing system existent on vessels, a suitable high-pressure source of liquid is available for flushing of the air outlet duct, the pressure in known fire extinguishing ducts amounting to several bars, such as up to ten bar. The flushing fluid duct may be connected to the air outlet duct via a valve. The valve, which may comprise a butterfly valve, can be closed when no flushing occurs and the flushing duct may be detached from the air outlet duct. When flushing needs to take place, the flushing duct may be attached to the air outlet duct via a valve, and the duct section upstream of the flushing duct will be closed for preventing flushing fluid from travelling upward in the air outlet duct.

In a further embodiment according to the invention, the deflector has an elongate part extending in the length direction of the cavity over at least at least 5%, preferably at least 10% of the cavity length L.

The wave deflector according to the invention stabilizes the flow inside the cavity. By providing a wave deflector inside the cavity with a relatively long dimension in the cavity length direction, the cavity can be filled with air effectively while the vessel is sailing, e.g. at a speed of 20 knots. In operation, the deflector effectively shields the air-filled cavity from water entry due to waves and roll motions of the vessel, the elongate deflector part keeping the water surface inside the cavity stable during roll motions, such that a stable operation of the cavity is warranted. Also in case the vessel sails without air inside the cavity, the elongate deflector part according to the invention results in an undisturbed water flow at reduced drag.

As used herein, the wording "substantially flat bottom" is intended to mean a bottom extending in a plane that may be at an angle of between +5° and −5° to the horizontal.

The deflector according to the invention may be formed by one or more perforated plate members, or may be in the form of a lattice or framework structure.

In an embodiment of a system according to the invention, the deflector comprises a number of deflector members, each having a horizontally oriented part, wherein a spacing in the length direction of the cavity between adjacent elongate parts is between 1% and 10% of the cavity length L.

During operation, air can pass in a uniformly distributed manner between the deflectors downwards to the Kelvin Helmholtz interface at the level of the bottom of the hull. By leaving relatively narrow strips of open area between adjacent deflectors, the deflector effectively shields the cavity from wave entry and from water entry during roll motions while air can freely travel to the Kelvin Helmholtz interface.

The speeds and airflows at which an effective Kelvin Helmholtz effect takes place are given in WO 2013/125951 on page 4 line 40-page 5 line 5, which are incorporated herein by reference. The bubbles formed by the air lubrication system according to the invention range in size from 0.5 mm to 5 mm. At lower speeds, it appeared that the bubbles formed had a size within the higher end of the range and typically measured between 3 mm and 5 mm in diameter. For higher speeds, the bubble size was found to be at the lower end of the range and to be between 0.5 mm and about 3 mm.

The vessels in which the cavities of the invention can be used may be smaller sized vessel for inland use, but are preferably oceangoing vessels, and may have a flat bottom with a length of at least 20 m up to a length of 500 m. The water displacement of the vessels suitable for use with the air lubrication system according to the invention may be 10.000 tons or more, preferably 50.000 ton or more and may comprise large ocean going tankers, bulk carriers, container ships or other cargo vessels, as well as ferries, cruise ships and other passenger ships.

The length of the cavity may between 2 m and 10 m, and the height of the cavity may be between 0.2 m and 1.5 m. The width of the cavity may range between 40 cm and 2 m. It was found that the above dimensions of the cavities is sufficient to create a stable Kelvin Helmholtz Interface effect for constant air bubble generation and flow of these bubbles into the boundary layer along the bottom.

The size of the cavity determines both the volume of air required for the generation of a stable layer of lubricating air bubbles, and determines the volume of air required for refilling the cavity after collapse and refilling with water. Hence, optimizing the cavity size determines the overall effectiveness of the air lubrication system and the efficiency of the total air supply and is decisive for overall energy efficiency of the system. This energy efficiency results in reduced fuel usage of the vessel and provides a high economic benefit.

The cavity may be rectangular in shape, but is preferably dagger-shaped or bullet-shaped at its front part for improved stability of the air-water interface.

It was found that the dagger- and bullet-shaped cavities reduced the wave formation on the free water surface. In this manner, the air-filled cavity was found to show improved stability compared to a cavity having a rectangular shape that will more quickly collapse.

In a further embodiment of the system according to the invention, each deflector comprises a horizontal section extending at least 10 cm, preferably at least 15 cm in the length direction of the cavity substantially parallel to the interface plane, and a curved transverse section curving upward, extending at least 10 cm in the length direction and at least 5 cm, preferably at least 10 cm upward from the height of the horizontal deflector section, wherein a distance between the adjacent deflector members in the length direction of the cavity is no larger than 1 m, preferably no larger than 30 cm, most preferably no larger than 10 cm.

The upwardly curved parts of the wave deflectors deflect during sailing when the cavity is filled with air, upwardly directed waves in a downward direction.

In an embodiment of a system in accordance with the invention, at least three deflector members are provided in the cavity, the horizontal deflector parts being situated in a deflector plane substantially parallel to the interface plane. Preferably the deflector plane is covering a substantial part of the cavity, such as at least 25% of the surface area of the interface plane, preferably at least 50%, more preferably at least 75%. In this way the cavity is effectively shielded from wave entry and the stability of the air-filled cavity is improved.

In another embodiment, the deflector plane is situated at a distance of at least 3 cm from the interface plane. By providing the deflector plane relatively close to the air-water interface, the upward movement of this interface, for instance during roll motion, is reduced and the stability of the air filled cavity is improved. Preferably, at a rear end of the cavity a rear cavity wall is sloping from the top wall to the interface plane when going in a rearward direction, at least one deflector element being situated below the sloping rear cavity wall.

Preferably an air supply opening is placed in the top wall for connection to a compressor outlet duct. The air that is injected into the cavity via the top wall, divides itself evenly from the top across the cavity and flows downwards along the deflectors to form a stable air-water interface. By providing the air inlet in the top wall of the cavity, the air flow at the front end remains relatively undisturbed and an optimal air-mixing Kelvin Helmholtz interface is formed. This is especially advantageous in case a bullet- or dagger-shaped cavity is employed.

A further embodiment of a vessel according to the invention has on each side of the center line at least three cavities that are distributed across the bottom in the length direction along a line extending from the center line near the bow, to a respective side. With this V-shaped cavity distribution an even blanket of air bubbles can be spread across the entire width of the bottom. According to a further embodiment, the cavities may be arranged in such a manner that the rear end of a cavity closest to the bow, is positioned further from the bow than the front end the adjacent cavity seen in the direction towards the stern.

For a vessel with a sharp stem and an accordingly shaped flat bottom, the cavities are following the hull shape for an optimal distribution of air lubrication across the width of the bottom. The fanning-out distribution of cavities results in improved strength of the bottom compared to the case in which the cavities are aligned in the length direction of the vessel.

For effective distribution of air bubbles across the hull, in the region near the bow, the two front most cavities are situated at a predetermined distance from the center line, two additional cavities closer to the stern being situated at a smaller distance from the center line. The central cavities, included inside the bounds of the V-shaped distribution, provide additional air lubrication along the center line of the vessel.

The cavities that are evenly spread in the transverse direction provide a good distribution of air lubrication along the flat bottom. The closely spaced cavities near the center line are tailored to the spread of the flow lines in the centre and were found to depend in position on the stability of the water after the encounter with the front of the vessel. The inventors have surprisingly found the central location of the closely spaced cavities after extensive CFD analysis.

For proper control of the airflow from each cavity, and with a view to providing a redundant system in case of failure, a vessel according to the invention comprises for each cavity or pair of cavities on opposite sides of the center line at a predetermined length position, a corresponding compressor for injecting air into the cavity at a pressure substantially corresponding to the hydrostatic pressure in each cavity. By providing a compressor for each cavity, the air flow into each cavity can be effectively controlled by setting the output of the compressor. This is far more energy-efficient than providing a single compressor and controlling the airflow to each cavity via a respective valve. Also retrofitting an existing vessel with air cavities is facilitated by the use of an individual compressor for each cavity instead of using a single bulky compressor. Finally, the use of a plurality of smaller sized compressors is favourable from a cost perspective over the use of a single large compressor.

The vessel may comprise near its bow a support deck, situated below an upper deck level, the compressors being situated on the support deck.

The air inlet opening in the top wall of the cavity may comprise a section with a relatively wide diameter that gradually tapers into a duct section of smaller diameter. The diameter of the air inlet opening may lie between 15 and 40 cm.

The widened air inlet was found to be effective for reducing the air speed at the inlet resulting in an undisturbed Kelvin Helmholtz interface and consequent optimal water-air mixing.

BRIEF DESCRIPTION OF THE DRAWINGS

Some embodiments of an air lubrication system according to the invention and a vessel comprising such a system will, by way of non-limiting example, be described in detail with reference to the accompanying drawings. In the drawings:

FIG. 3a shows a cross-sectional view of the system of FIG. 2, FIGS. 3b and 3c show an enlarged detail of different embodiments of a releaseable fastening member for the deflectos.

DETAILED DESCRIPTION OF THE INVENTION

Figure 1:
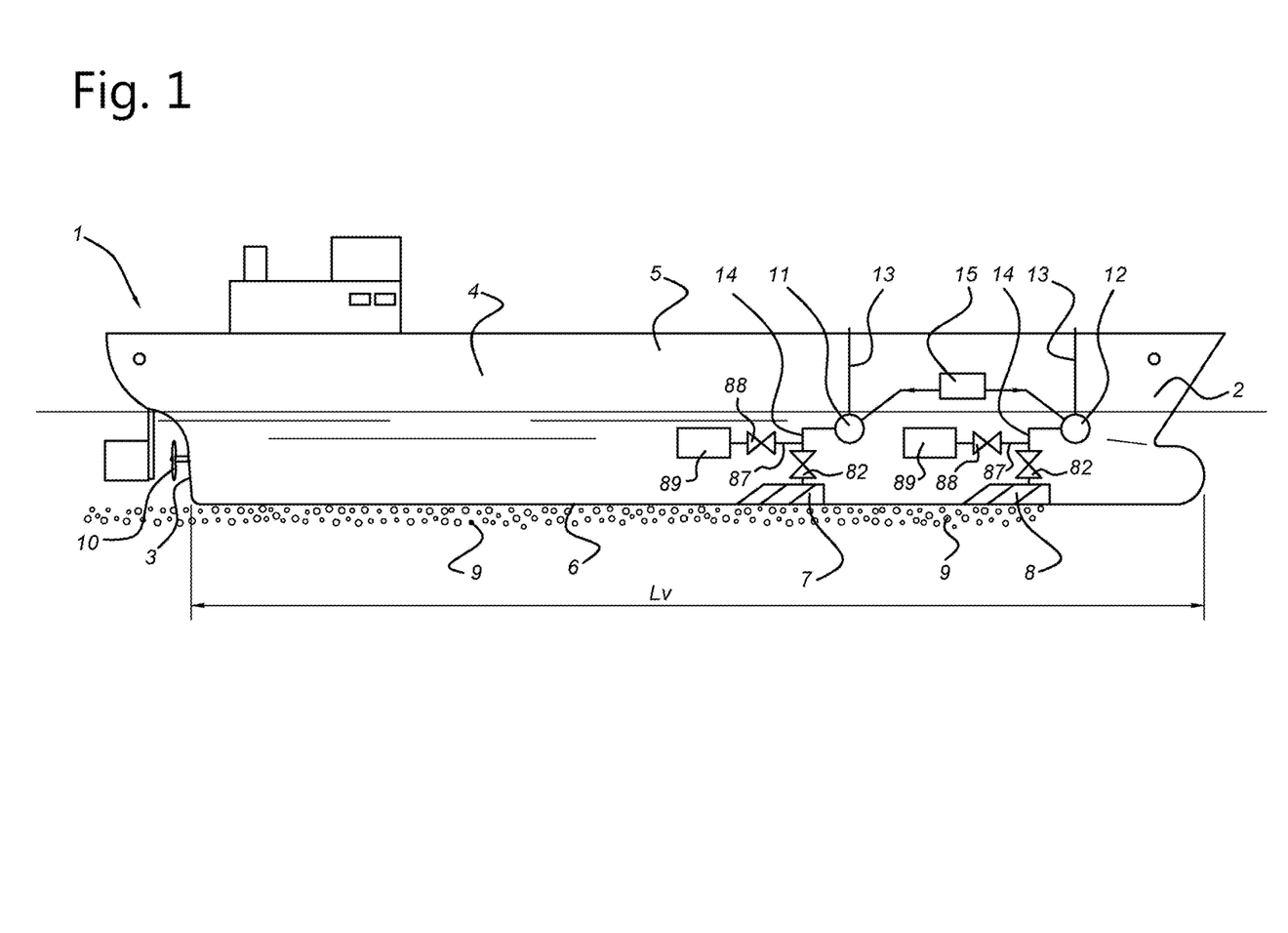
FIG. 1 shows a schematic side view of a vessel comprising an air lubrication system according to the invention.

FIG. 1 shows a vessel 1 having a length Lv of between 20 m and 500 m, and a width between 5 m and 75 m. The vessel 1 may have a water displacement of at least 10000 ton, preferably at least 50000 ton and is an ocean going vessel. The vessel 1 has a hull 4 with a bow 2, a stern 3, sides 5 a substantially flat bottom 6 and a propeller 10. Air lubricating cavities 7,8 that are open in the plane of the bottom 6, are distributed along the bottom 6 to generate a layer of bubbles 9 travelling towards the stern 3, along the flat bottom 6. Compressors 11,12 are connected to each cavity 7,8 for supplying air at the hydrostatic pressure inside each cavity at the prevailing draught level of the vessel. The compressors 11,12 are with an air outlet duct 14 connected to the cavities 7,8 and have an air inlet duct 13 for taking in ambient air. The compressors 11,12 are controlled by a controller 15, for regulating the air supply in dependence of the sailing speed, sea state and during starting and stopping. The air outlet ducts 14 are connected to the cavities 7,8 via a valve 82 which may be closed in case no air is supplied to the cavities and the air lubrication system is in its inoperative state.

FIG. 1. Shows for each cavity 7,8 a flushing fluid duct 87 connected to a flushing fluid source 89 via a valve 88. This valve may comprise for instance a butterfly valve. When sailing in shallow waters, the cavities 7,8 and air outlet ducts 14 may become filled with silt or other material originating from the sea bed. When the valve 88 is opened, the air outlet duct 14 and the cavities 7,8 are flushed by high-pressure flushing fluid from the fluid source 89. The valves 82 are opened in order to allow fluid to exit the cavities 7,8. The fluid source 89 may be comprised of the standard fire extinguishing system present on the vessel 1, which is able to supply water to the air outlet ducts 14 at pressures of for instance up to ten bar.

Figure 2:
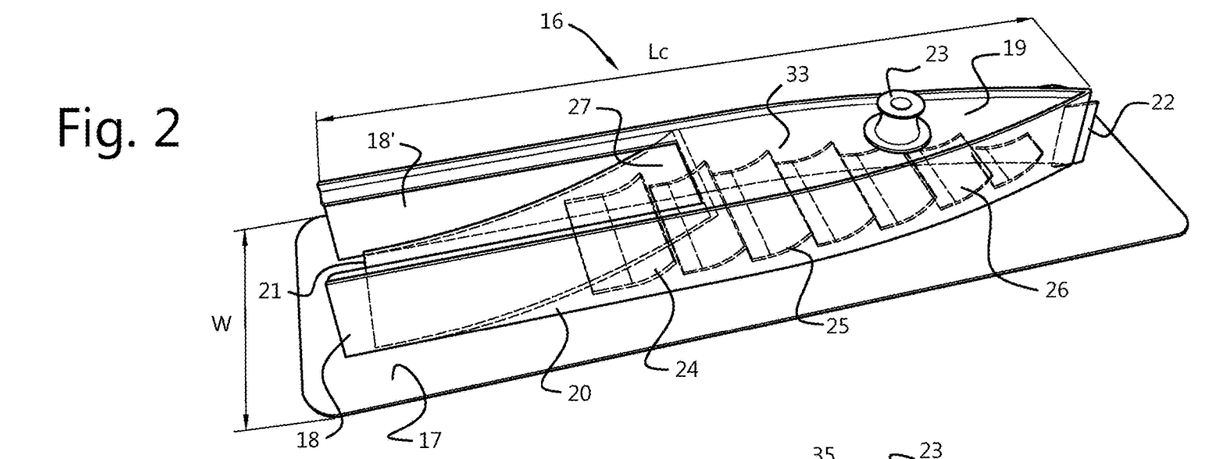
FIG. 2 shows a perspective view of an air lubrication system according to the invention.

FIG. 2 shows an air lubrication system 16 that is constructed as an integral module forming a cavity 33 that can be fitted into the bottom 6 of the hull 4 of a vessel 1. The system 16 comprises sidewalls 18, 18' and a top wall 19. The sidewalls 18,18' are supported on a flange 17 that can be welded into the flat bottom 6 of the vessel 1. The sidewalls 18,18' delimit an opening 20 that is substantially level with the flat bottom surface of the vessel, the opening 20 forming a smooth air-water interface plane in which air is mixed into the water due to the Kelvin Helmholtz mixing effect. Air bubbles that are mixed with the water at the interface plane leave the cavity along rear edge 21 to pass in a smooth transition from the cavity onto the bottom and to travel unrestricted along the flat bottom 6 in the direction of the stern 3. A concavely curved, downwardly sloping wall part 27 connects the top wall 19 with the rear edge 21 to guide the air and water inside the cavity in a smooth flow pattern to the exit point situated along lower rear edge 21.

The front end 22 of the cavity 33 is dagger-shaped and an air inlet 23 is situated in the top wall 19. The air inlet 19 can be connected to one of the air outlet ducts 14 of the compressors 11,12.

Inside the cavity 33, a number of curved wave deflectors 24,25, 26 extends across the width W of the cavity and are connected to the sidewalls 18, 18'. The length Lc of the cavity 33 may be about 4 m, the width W being about 75 cm, and the height Hc being about 45 cm. The sidewalls 18,18' may have a thickness of 16 mm, whereas the flange 17 and top wall 19 may have a thickness of 20 mm.

The inventors have discovered that the following key principles apply for proper air lubrication system design:

The wave deflectors inside the cavity stabilize the water flow inside the cavity. This is important for two reasons: Firstly the deflectors enable filling the cavity with air during speed of the vessel. Secondly, the deflectors minimize resistance of the cavity while the system is off (without air input).

The wave deflectors are to be positioned above the interface plane of the cavity for obtaining an undisturbed flow of water pass the cavity during speed of the vessel. When the cavity is full of air, the deflectors are free of the water surface. They also help maintaining the surface of the water stable during roll motions of the vessel.

The slope at the rear wall of the cavity helps smooth release of the air bubbles into the boundary layer of the vessel and is designed to help to inject the bubbles that are formed by Kelvin Helmholtz mixing into the immediate vessel surface boundary layer, minimizing vertical dispersion and optimizing drag reduction.

The shape of the front of the cavity, i.e. wedge-shaped or bullet-shaped, controls water flow and minimizes wave instability at the air/water interface and improves consistent air mixing into the boundary layer by the Kelvin Helmholtz effect.

The length of the cavity is to be chosen sufficient to create a stable Kelvin Helmholtz air mixing effect for constant air bubble generation and flow of air bubbles into the boundary layer.

The relative positioning of the cavities under the hull is important to maximize the air-lubricated surface area of the hull.

The size of the cavity determines both the volume of air required for stable air bubble generation and required for recovery of the cavity after air pocket collapse. Optimizing the size of the cavity determines the overall lubrication effectiveness and the efficiency of the total air generation.

Figures 3A, 3B, 3C:
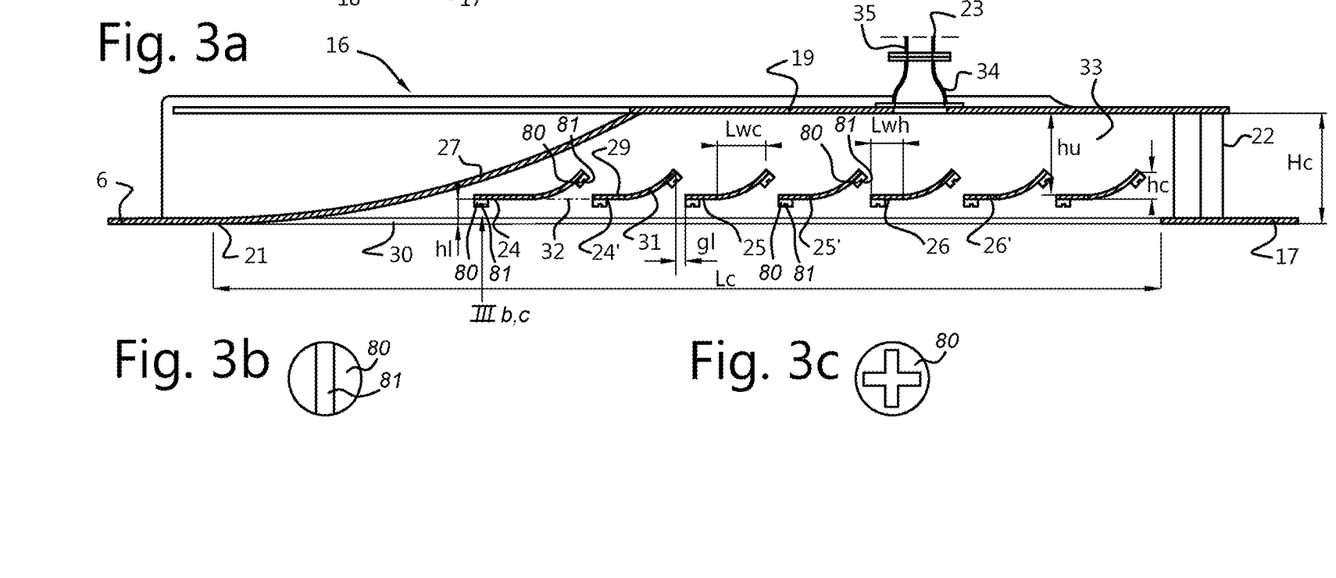

As is clear from FIG. 3a, the wave deflectors 24,24'; –26,26' each have a horizontal part 29 extending at a distance hl of about 5 cm from the open interface plane 30 in which the boundary layer between air inside the cavity 16 and the water flowing along the flat bottom 6 is situated. The wave deflector horizontal part 29 has a length Lwh of about 20 cm, and the wave deflector curved part 31 having a length Lwc of about 20 cm. The distance hu of the horizontal wave deflector parts 29 from the top wall 19 is about 30 cm. The horizontal parts 29 of all wave deflectors lie at substantially the same height in a deflector plane 32. The height hc of the curved deflector part is about 11 cm. The distance gl between adjacent wave deflectors 24, 24' is about 5 cm. The projected surface area of the wave deflectors 24-26; on the interface plane 30 covers at least 25%, preferably at least 50%, most preferably at least 75% of the surface area of the interface plane.

The deflectors 24-26' are connected to the cavity walls or to the hull via bolts 80 which are accessible via the open interface plane 30 when the vessel 1 is in dry dock for maintenance. As shown in the enlarged details of FIG. 3b and FIG. 3c, the bolt 80 may provided with slots or may comprise hexagon-heads or recessed heads. By easy removal of the deflectors 24-26', the interior of the cavity 16 can be easily accessed for maintenance and/or inspection.

The air inlet 23 is provided with a relatively wide section 34 connecting to a smaller diameter compressor outlet duct 35 which wide section reduces the air speed and provides a gradual inflow of air into the cavity 3.

Figure 4:
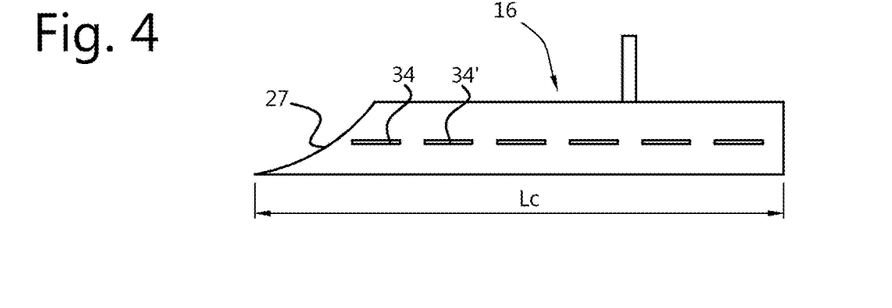
FIG. 4 shows a schematic side view of a cavity with an elongate deflector according to the invention.

FIG. 4 shows a schematic rendering of an air lubrication system 16 comprising a number of substantially horizontal deflector members 34, 34'. The deflector members 34,34' may be separate strips supported across the width of the cavity, or may be part of a unitary deflector 28 of a type as schematically shown in FIGS. 5a-5c.

Figure 5A:
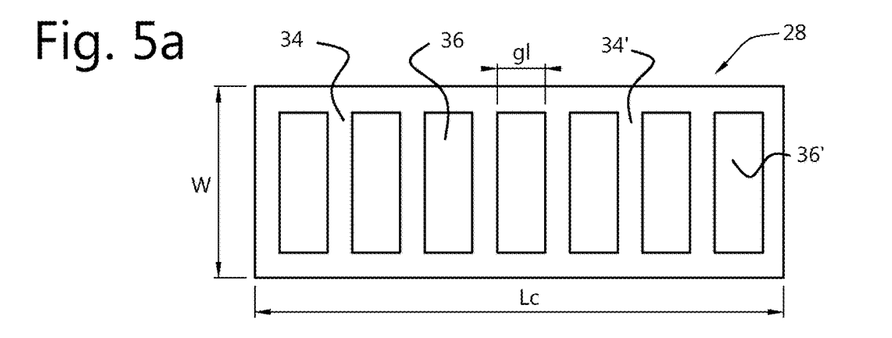
FIGS. 5a-5c show different embodiments of a deflector according to the invention.

In the embodiment of FIG. 5a, the deflector 28 comprises a plate-shaped body with a number of slits 36,36'. The elongate deflector parts 34, 34' are part of a unitary plate-shaped deflector 28.

Figure 5B:
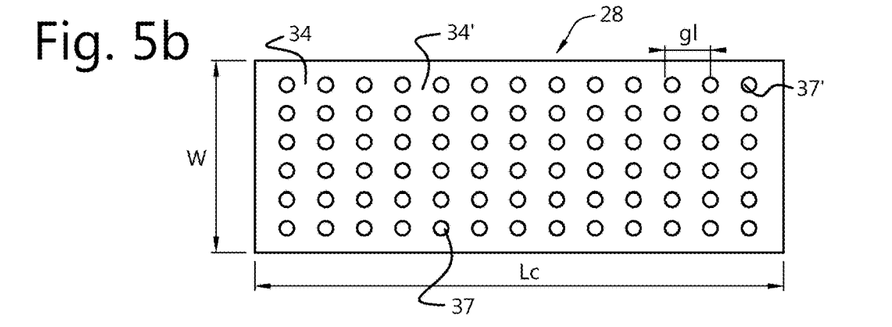

In the embodiment of FIG. 5b, the deflector 28 is in the form of a perforated plate. The holes 37,37' define elongate deflector parts 34, 34'.

Figure 5C:
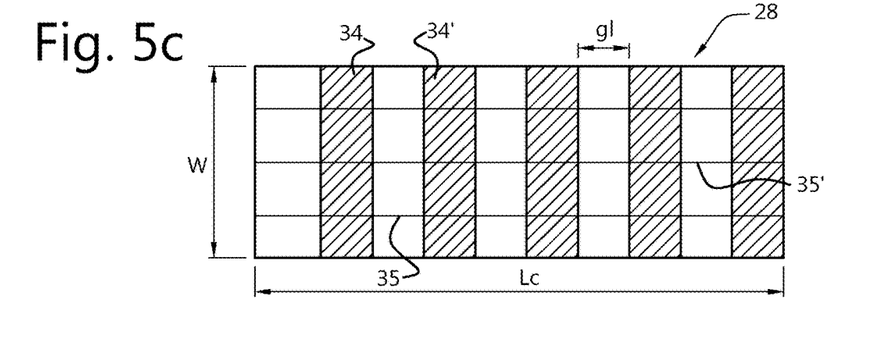

In the embodiment of FIG. 5c, the deflector 28 is lattice or framework shaped, wherein the elongate deflector members 34, 34' are interconnected by transverse girders 35,35'.

Figure 6:
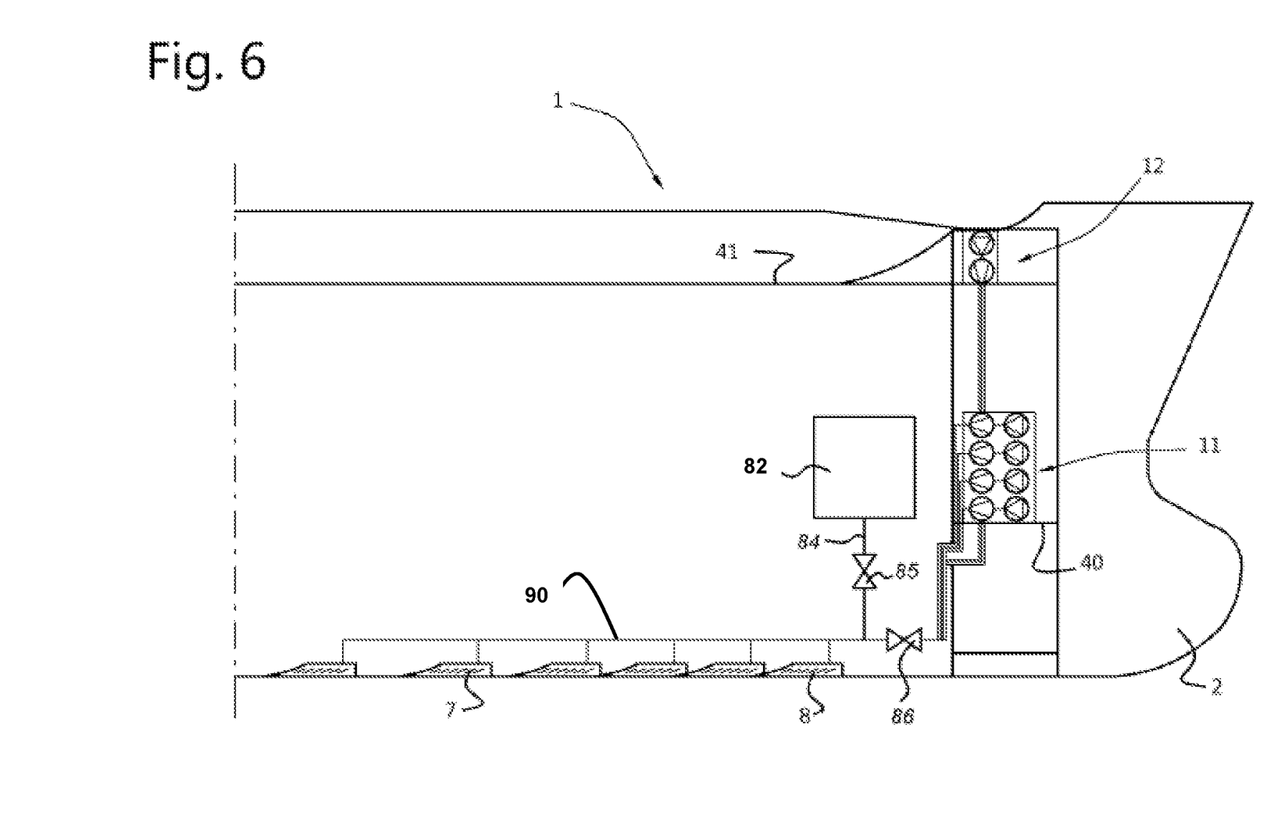
FIG. 6 shows a partly cut-away view of a vessel comprising for each cavity a respective compressor situated on a support deck near the bow.

As can be seen in FIG. 6, a number of compressors 11 is supported on a compressor supporting deck 40 near the bow 2 of the vessel 1. Other compressors 12 are situated near the bow 2 at the level of upper deck 41. One compressor 11,12 is provided for each cavity 7,8.

The flushing fluid source 82 is connected to air supply duct 90 of the cavities 7,8 via a valve 85. When valve 86 is closed, the air supply duct 90 downstream of the valve 86 may be flushed by high pressure water upon opening of valve 85. The flushing fluid duct 84 may be fixed, but may also be laid out for temporary use and may for instance be formed by a regular fire hose.

Figure 7:
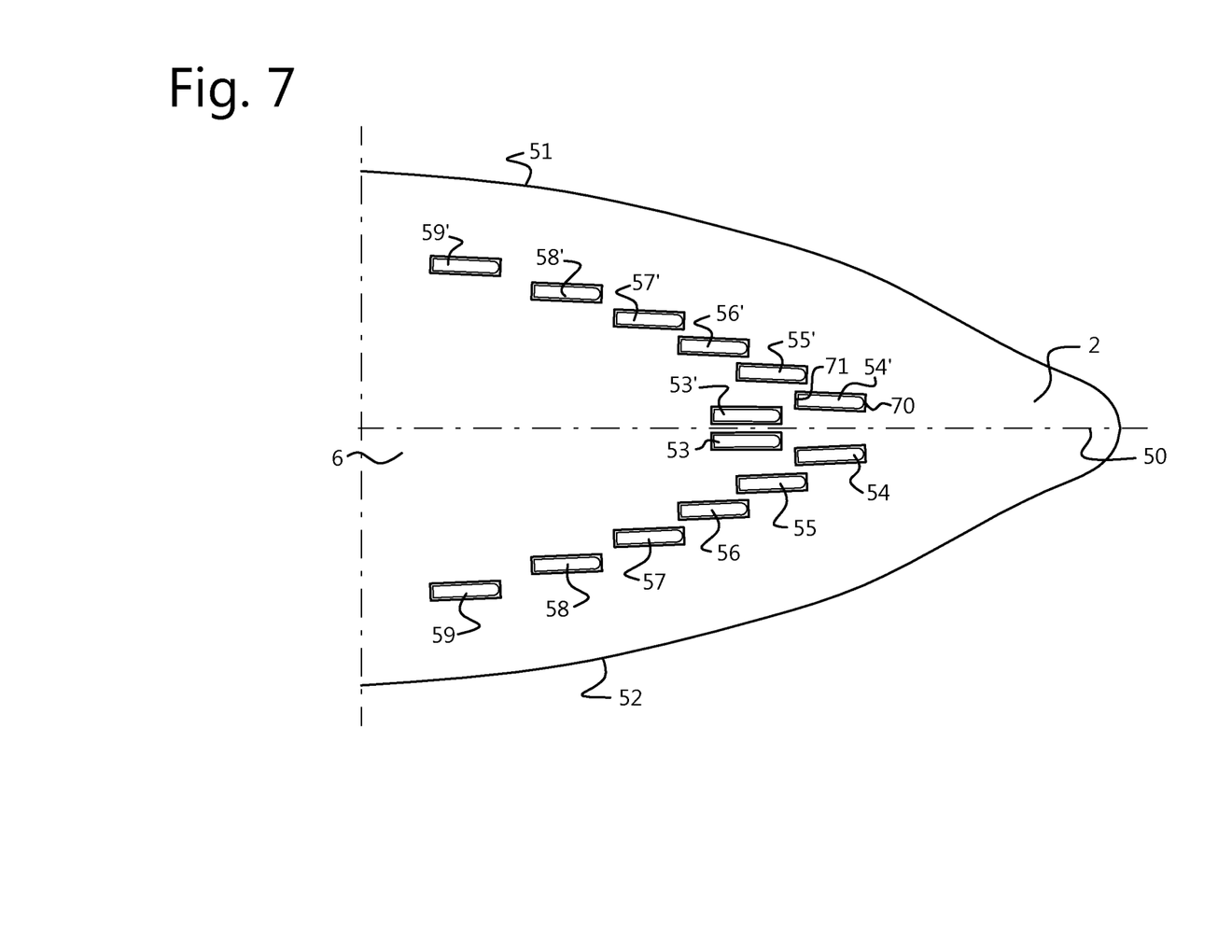
FIG. 7 shows a number of cavities near the bow in a V-shaped configuration.

In FIG. 7 it is shown that a number of cavities 54,54'-59, 59' is distributed along lines running from the center line 50 to the sides 51, 52 when going in a rearward direction. Two central cavities 53,53' are provided in proximity to the center line 50. The center line of the cavities 54-59' is at a slight angle with respect to the centre line 50. For cavities 54,55,56 and 57 and 54', 55', 56' and 57' the front part 70 is located closer to the bow 2 than the rear part 71 of the cavity ahead. This 'overlap' provides an even distribution of air bubbles across the flat bottom 6.

Figure 8:
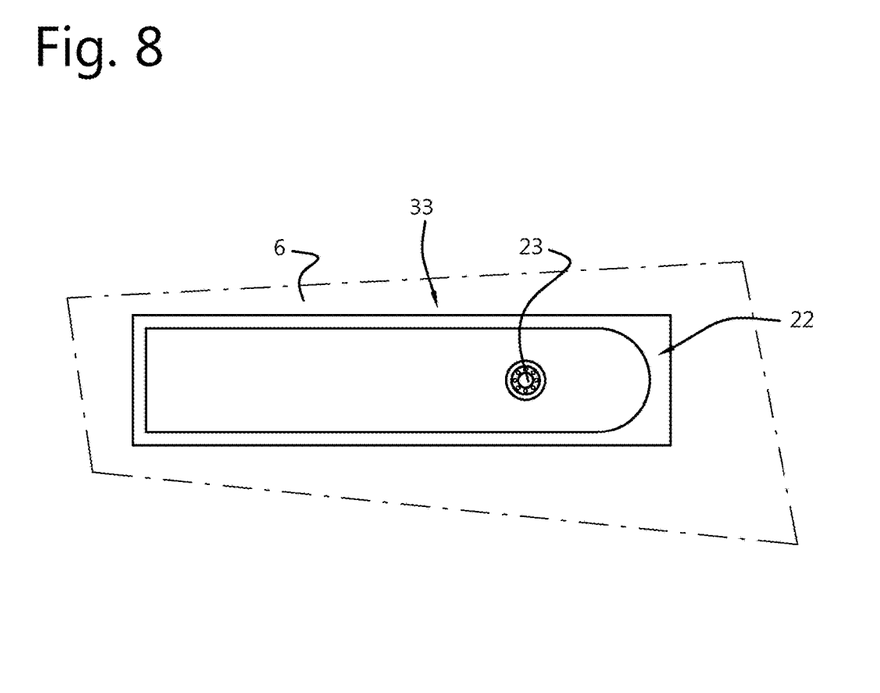
FIG. 8 shows an embodiment of a bullet-shaped cavity with a rounded front part.

As can be seen in FIG. 8, the cavity 33 has at its front end 22 a rounded head, such as to be bullet-shaped. It was found that both the rounded bullet-shaped front end 22 as well as the dagger-shaped front end result in the formation of a stable air-water interface inside the cavity 33 without wave formation along the interface plane.

The invention claimed is:

1. A vessel comprising a system for providing an air lubricating layer between a hull of a vessel and water flowing along the hull as the vessel is moving through the water, the system comprising:
   sidewalls;
   a top wall defining a cavity with an opening situated in an interface plane that is transversely to the sidewalls, at a level of the hull, the opening having a front end and a rear end when seen in a length direction of the cavity;
   a compressor connected to the cavity, the compressor supplying air into the cavity via an air outlet duct,
   a flushing fluid duct; and
   a flushing fluid source connected to said flushing fluid duct, wherein
   the flushing duct in operation is connected to the air outlet duct.

2. The vessel according to claim 1, wherein the flushing duct comprises a fire extinguishing duct or hose, and the flushing fluid source comprising a fire extinguishing system.

3. The vessel according to claim 1, wherein the flushing fluid duct is connected to the air outlet duct via a valve.

4. Vessel according to claim 1, wherein the system further comprises an air inlet spaced from the opening of the cavity, the cavity having a length (Lc), a distance of the top wall from the interface plane (Hc) and a width (W), wherein a ratio Lc/Hc is in a range of 7:1 to 13:1, a ratio W/H is in a range of 1.3:1 to 2.5:1 and a ratio Lc/W is in a range of 3.5 to 1 to 7:1, wherein
   an air inlet opening is provided in the top wall.

5. A vessel, comprising:
   a hull having a center line, opposing sides and a flat bottom; and
   a plurality of air lubricating systems, each air lubrication system comprising sidewalls and a top wall defining a cavity with an opening situated in an interface plane that is transversely to the sidewalls, at a level of the flat bottom, the opening having a front end and a rear end seen in a length direction of the cavity, an air inlet spaced from the opening of the cavity, the cavity having a length (Lc), a distance of the top wall from the interface plane (Hc) and a width (W), wherein a ratio Lc/Hc is in a range of 7:1 to 13:1, a ratio W/H is in a range of 1.3:1 to 2.5:1 and a ratio Lc/W is in a range of 3.5 to 1 to 7:1, wherein
   the vessel accommodates for each cavity or pair of cavities on opposite sides of a center line at a predetermined length position, a corresponding compressor for injecting air into the cavity at a pressure corresponding to a hydrostatic pressure in each cavity.

6. The vessel according to claim 5, wherein the length (Lc) of the cavity is between 2 and 10 m, the distance of the top wall from the interface plane is between 0.2 m and 1.5 m, and the width (W) being is 0.4 m and 2 m, wherein
   the length (Lc) of the cavity is between 2 and 10 m, the distance (Hc) of the top wall from the interface plane is between 0.2 m and 1.5 m, and the width (W) is between 0.4 m and 2 m.

7. The vessel according to claim 5, wherein each cavity is in said top wall and is provided with an air inlet connected to the corresponding compressor.

8. The vessel according to claim 5, wherein the vessel comprises near the vessel's bow a support deck, situated at a vertical level below an upper deck level, the compressors being situated on the support deck.

9. A system for providing an air lubricating layer between a flat bottom of a hull of a vessel and water flowing under the flat bottom as the vessel is moving through the water, comprising:
   sidewalls;
   a top wall defining a cavity with an opening situated in an interface plane that is transversely to the sidewalls, at a level of the flat bottom, the opening having a front end and a rear end seen in a length direction of the cavity;

an air inlet spaced from the opening of the cavity, an opening of the air inlet being provided in the top wall; and the cavity having a length (Lc), a distance of the top wall from the interface plane (Hc) and a width (W), wherein a ratio Lc/Hc is in a range of 7:1 to 13:1, a ratio W/H is in a range of 1.3:1 to 2.5:1 and a ratio Lc/W is in a range of 3.5 to 1 to 7:1.

10. The system according to claim 9, wherein the length (Lc) of the cavity is between 2 and 10 m, and the distance (Hc) of the top wall from the interface plane is between 0.2 m and 1.5 m.

11. The system according to claim 9, wherein the air inlet opening comprises a section with a diameter that tapers into a duct section with a smaller diameter than the diameter of the section.

12. The system according to claim 9, wherein a non-return valve is present in the ducts between the compressors and the corresponding cavities.

\* \* \* \* \*